United States Patent [19]
Dreyer et al.

[11] Patent Number: 4,561,472
[45] Date of Patent: Dec. 31, 1985

[54] SLIDING BLADE CLOSURE APPARATUS WITH INFLATABLE SEALING RING

[75] Inventors: Paul L. Dreyer, Allentown; William R. McLennan, Easton, both of Pa.

[73] Assignee: Ecolaire Incorporated, Malvern, Pa.

[21] Appl. No.: 591,588

[22] Filed: Mar. 20, 1984

[51] Int. Cl.⁴ .......................... F16K 3/36; F16K 49/00
[52] U.S. Cl. ................................. 138/94.3; 138/94; 137/240; 251/172
[58] Field of Search .......................... 138/89, 94.3, 94; 251/172, 327, 328, 159; 137/315, 454.2, 559, 240, 340; 126/285 A

[56] References Cited

U.S. PATENT DOCUMENTS

| | | | |
|---|---|---|---|
| 1,476,344 | 12/1923 | McGee et al. | 138/94.3 |
| 2,240,049 | 4/1941 | Murphy. | |
| 3,145,969 | 8/1964 | Von Zweck | 251/172 |
| 3,367,625 | 2/1968 | Fortune | 251/172 |
| 3,371,493 | 3/1968 | Woolley | 251/172 X |
| 4,163,458 | 8/1979 | Bachmann | 251/172 X |
| 4,176,673 | 12/1979 | Connor | 137/240 |
| 4,235,256 | 11/1980 | Crawshay | 138/94.3 X |
| 4,292,992 | 10/1981 | Bhidé251 | 172 X/ |

Primary Examiner—James E. Bryant, III
Attorney, Agent, or Firm—Sutherland, Asbill & Brennan

[57] ABSTRACT

A conduit closure apparatus, e.g., a damper, comprising a frame adapted for connection to a conduit in a position generally in registry with the conduit, a movable blade slidably mounted in the frame, means for moving the blade back and forth between an open position in which the blade is outside the conduit and a closed position in which the blade blocks the conduit, an opening in the frame through which the blade slides when it is moved between its open and closed positions, an inflatable sealing ring mounted in the frame that is operable, when inflated, to press against the face of the blade at the blade's periphery when the blade is in the closed position, thereby creating a seal between the blade and the frame, and means for inflating said sealing ring, is improved by including means for pulling a sufficient vacuum on the interior of the sealing ring to cause the ring to collapse and recede from contact with the blade, thereby creating a wider separation between the ring and the blade than if the interior of the ring were at atmospheric pressure. This lessens the chances of the sealing ring being abraded and damaged during movement of the blade, for example by encrustation on the side of the blade.

10 Claims, 8 Drawing Figures

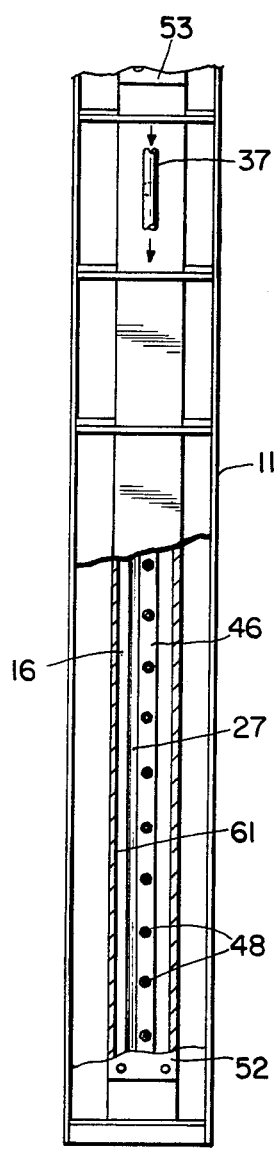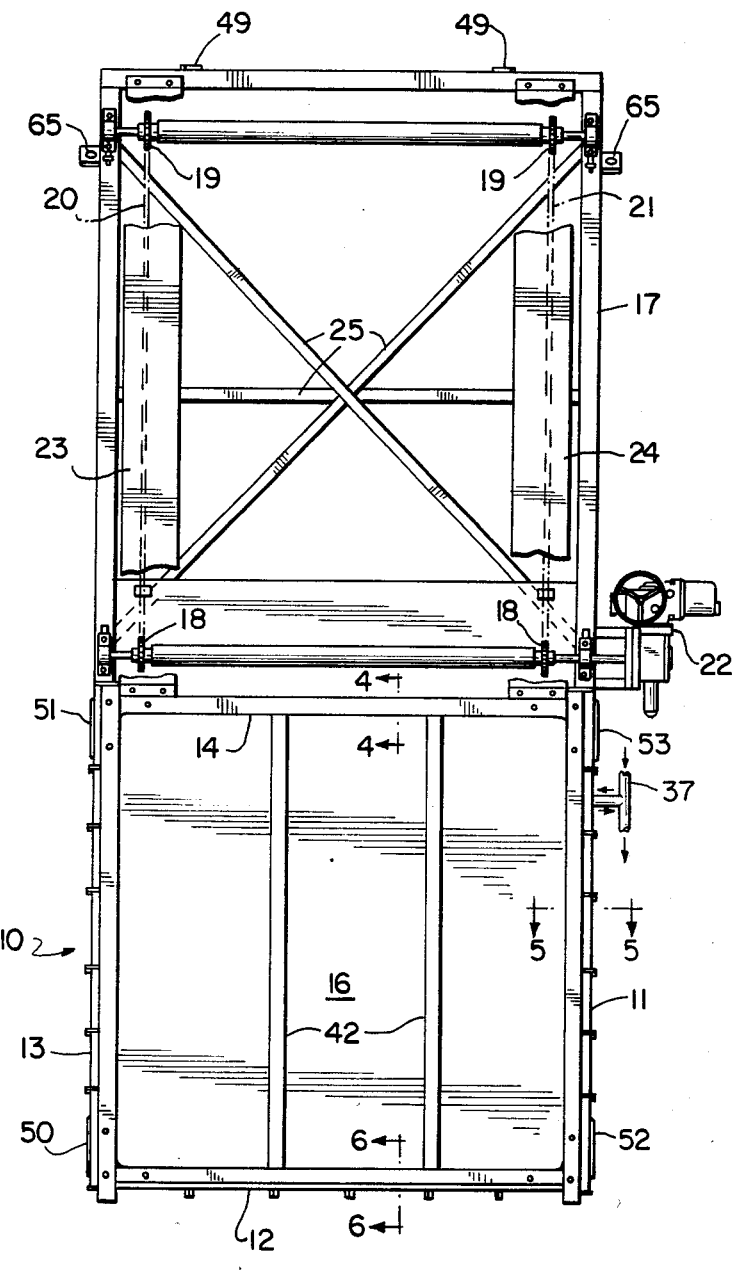
FIG. 2
FIG. 3

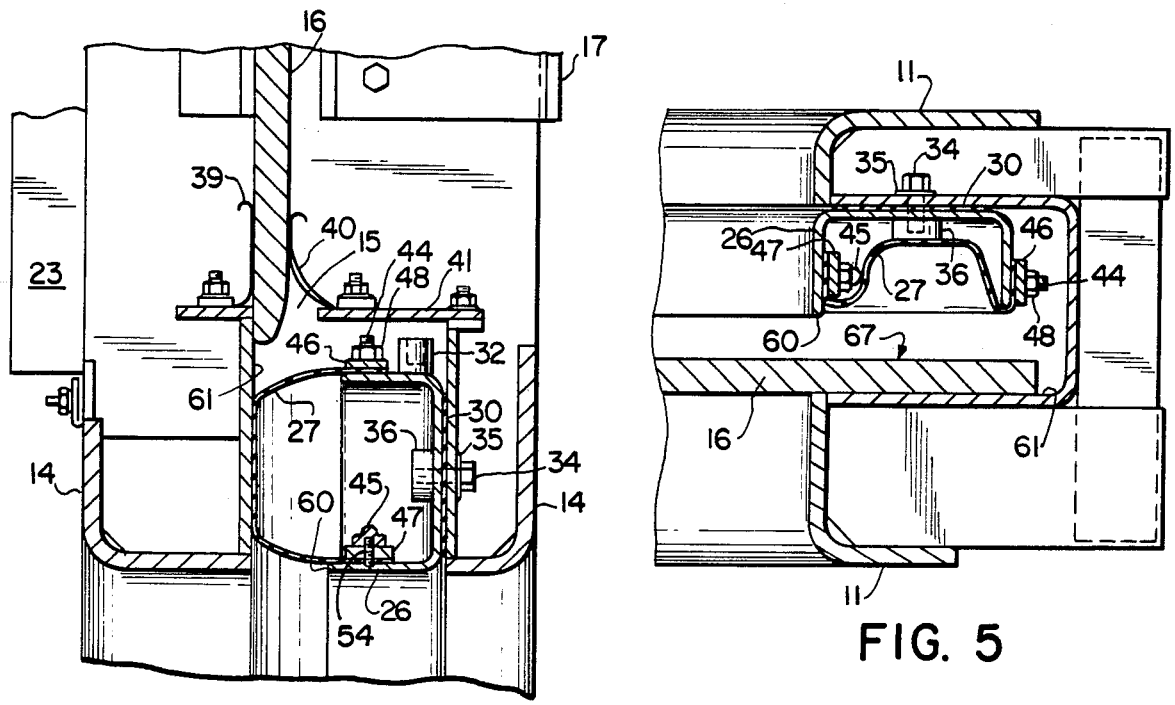
FIG. 4
FIG. 5
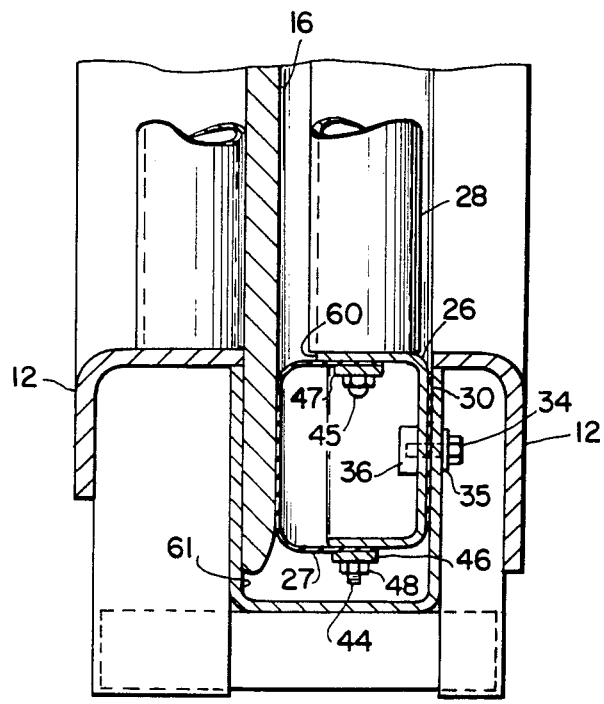
FIG. 6

SLIDING BLADE CLOSURE APPARATUS WITH INFLATABLE SEALING RING

This invention concerns apparatus for temporarily closing conduits, e.g., dampers or sluice gates. In particular, it concerns such apparatus as have a sliding blade as the closure member and an inflatable ring to seal around the periphery of the blade when it is closed.

Conduit closure apparatus that use a sliding blade as the closure member are well known. Such an apparatus will often include a frame adapted for connection to a conduit in a position generally in registry with the conduit, a movable blade slidably mounted in the frame, an opening in the frame through which the blade can slide, and means for sliding the blade back and forth between an open position, in which the blade is outside the conduit, and a closed position, in which the blade blocks the conduit. To provide an especially tight seal when the blade is in the closed position, it is known that an inflatable ring can be carried by the frame that is operable, when inflated, to press against the face of the blade, around the blade's periphery, thereby creating a seal between the blade and the frame. See, for example, U.S. Pat. No. 4,163,458 to Bachmann and No. 1,476,344 to McGee et al.

The closure apparatus just described are effective for their intended purpose, but their sealing rings frequently are damaged during movement of the blade in one direction or the other. Although the ring is deflated before the blade is moved, the gap between the ring and the blade is often sufficiently narrow that at some place around the ring the side of the blade will rub against the ring. Because it has to be flexible, the ring usually is made of material that is not strong enough to withstand hard abrasion, such as may result if there is encrustation on the blade. Often the result is that the ring is torn and has to be replaced.

We have invented an improved form of this type of conduit closure apparatus which overcomes the problems of sealing ring damage incurred during movement of an encrusted blade. In our apparatus there is means not only for inflating the sealing ring, but also for pulling a sufficient vacuum on the interior of the ring to cause the ring to collapse and recede from contact with the blade, thereby creating a wider separation between the ring and the blade than if the interior of the ring were at atmospheric pressure. In this manner the gap between sealing ring and frame may be widened considerably prior to moving the blade, thereby lessening the chance of abrasive contact between the two parts. The useful life of the sealing ring is consequently lengthened, and the cost to operate the damper is lessened.

Preferably, the apparatus of the present invention includes a channel in the frame which provides a track for the blade to slide in, as well as to rest in when the blade is in the closed position. The sealing ring is located inside the channel and is fastened to one of the walls of the channel, so that the ring presses with sufficient force against the side of the blade, when the blade is in the closed position and the sealing ring is inflated, that the blade is squeezed between the ring and the opposite wall of the channel.

It is further preferred, when using this last-mentioned arrangement, to size the ring so that, when the blade is in the open position, and the ring is fully inflated, the ring will press against the opposite wall of the channel, so as to seal the mouth of the channel. The benefit from this feature is that it prevents debris from collecting in the channel while the blade is open. For a sliding blade damper, for example, to operate properly, the blade channel must be kept sufficiently clear that the blade can be slid all the way closed, i.e., can be fully seated. Fly ash and sludge sometimes collect in the blade channels of prior art dampers, however, while the dampers are open, preventing full closure of the blade later. When this occurs, the damper frequently will fail to close the conduit with as tight a seal as is needed. The problem can be especially troublesome if the damper is needed to protect workers on the downstream side from poisonous gases held behind the damper. That is the situation, for example, with dampers that are used in flue gas conduits leading to electrostatic precipitators and/or sulfur dioxide scrubbers. The maintenance routine for sulfur dioxide scrubbers requires workers to actually enter the scrubber periodically, while the flue gas is routed to one or more alternate scrubbers. For worker safety, the damper has to seal the conduit to its maximum design capability. This requires that the blade channel be clear of debris at the time of closure. Sometimes, with prior art dampers, the boiler has to be shut down long enough to permit the blade channel to be cleaned manually. With the preferred embodiment just described, this problem is largely avoided, since the inflated sealing ring closes the mouth of the blade channel while the damper is open, preventing debris from collecting in the channel.

As mentioned, a sliding blade closure apparatus has an opening in the frame through which the blade travels. Usually, this opening will be a slot-like port. It is preferred in the present invention that this port have a wall along substantially the entire length of each of the opposite sides of the port, the walls being substantially parallel to the plane of the blade, and that a segment of the sealing ring be fastened to one of those port walls. The width of the port and the size of the ring should be such that, when the blade is closed and the ring is inflated, the ring presses against the face of the blade with sufficient force to squeeze the blade between the ring and the opposite wall of the port. Also, just as in the case of the blade channel, it is preferred that the ring have a sufficient diameter that when it is inflated and the blade is in the open position, the ring presses against the opposite port wall, so as to seal the port. These preferred features provide frame-to-blade sealing on the face of the blade when it is closed, and prevent the escape of any conduit fluid through the blade port when the blade is in the open position.

Another preferred feature of the apparatus of the present invention is that it have stop means which prevent the closed blade from touching the sealing ring whenever the ring is collapsed. This function may be performed, for example, by one or more rigid members carried by the frame that present a blade-stopping surface lying in a plane somewhere between the closed blade and the collapsed sealing ring.

The sealing ring either can have one continuous internal chamber or it can be divided into segments. While it must be made of a flexible, air-tight, sheet material, the ring does not have to be significantly expandable. An elastomer-coated fabric is preferred. For use in high temperature applications, such as flue gas dampers, a fluoroelastomer having a knit wire mesh embedded therein is especially preferred. This type of material is disclosed, for example, in U.S. Pat. No. 4,403,796, in which the material is used to make expansion joints.

The drawings accompanying this specification depict a sliding blade damper embodying the present invention, which is designed for use in a power plant flue gas conduit. The damper is useful, for example, to control a conduit leading to a flue gas scrubber.

Referring to the drawings

FIG. 2 is an enlarged side view of the lower half of the damper, partially broken away, with the blade in the closed position.

FIG. 3 is a front elevational view of the damper, also partially broken away, with the blade in the closed position, and showing the drive mechanism.

FIG. 4 is an enlarged, partial sectional view, taken along the line 4—4 in FIG. 3, of the upper horizontal segment of the sealing ring, and associated equipment, but with the blade in the open position. The sealing ring is shown inflated to sealing pressure in FIG. 4.

FIG. 5 is an enlarged, partial sectional view, taken along the line 5—5 in FIG. 3, of one of the vertical segments of the sealing ring, and associated equipment, with the blade in the closed position and the ring under a vacuum and collapsed.

FIG. 6 is an enlarged, partial sectional view, taken along the line 6—6 in FIG. 3, of the lower horizontal segment of the sealing ring, and associated equipment, with the blade closed and the ring inflated to sealing pressure.

Figure 1:
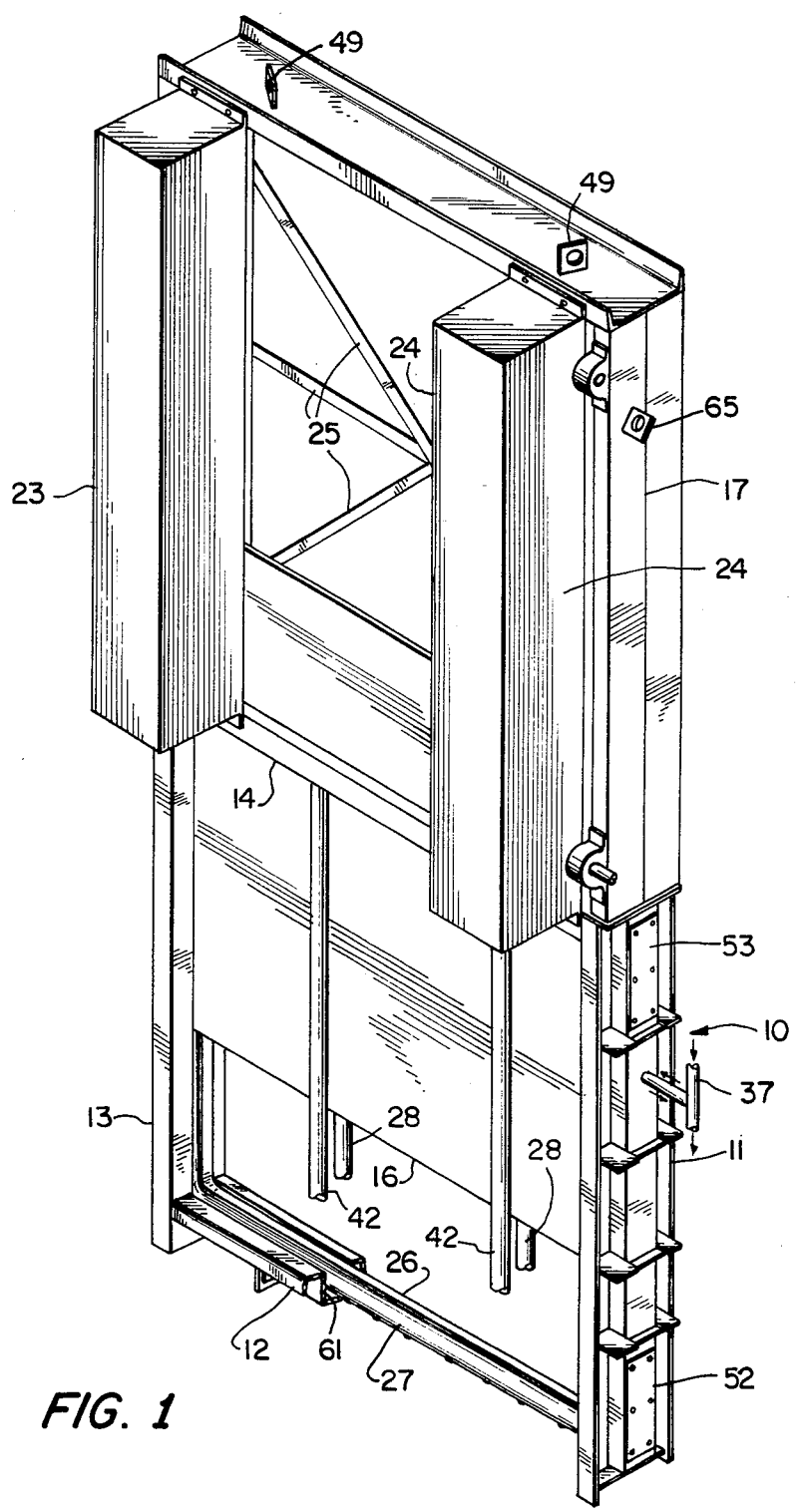
FIG. 1 is a perspective view of the damper, partially broken away, at the front right corner, showing the blade partially open and the sealing ring deflated. The drive mechanism is omitted in this figure for simplicity's sake.

The apparatus shown in the drawings is constructed around a main frame 10, which has three channel members, 11, 12, and 13, and an upper horizontal member 14 in which there is a slot-like opening 15 (see FIG. 5) through which blade 16 moves during opening and closing of the damper. Main frame 10 is adapted to be drilled and bolted to a conduit (not shown) through the flanged edges of members 11, 12, 13, and 14.

Main frame 10 is strengthened by a pair of upright tubes 42 that are welded to members 12 and 14. Tubes 42 also help guide blade 16. Mounted on top of main frame 10 is superstructure 17, which contains lower sprockets 18 and upper sprockets 19 and drive chains 20 and 21, which are attached to blade 16 for raising and lowering the blade. The means of attachment of blade 16 to drive chains 20 and 21 is not shown in the drawings. Suitable means are well known, however.

A drive mechanism 22, for turning lower sprocket 18, is shown in FIG. 3; but, for purposes of simplification, it has been omitted from FIG. 1. Housings 23 and 24 are carried by superstructure 17 to guard sprockets 18 and 19 and drive chains 20 and 21. Superstructure 17 is braced by stretcher members 25, as required. Welded to superstructure 17 is a first pair of lifting lugs 49, on the top, as well as a second pair 65, on the sides, which enable the damper to be held by a crane during installation.

Figure 7:
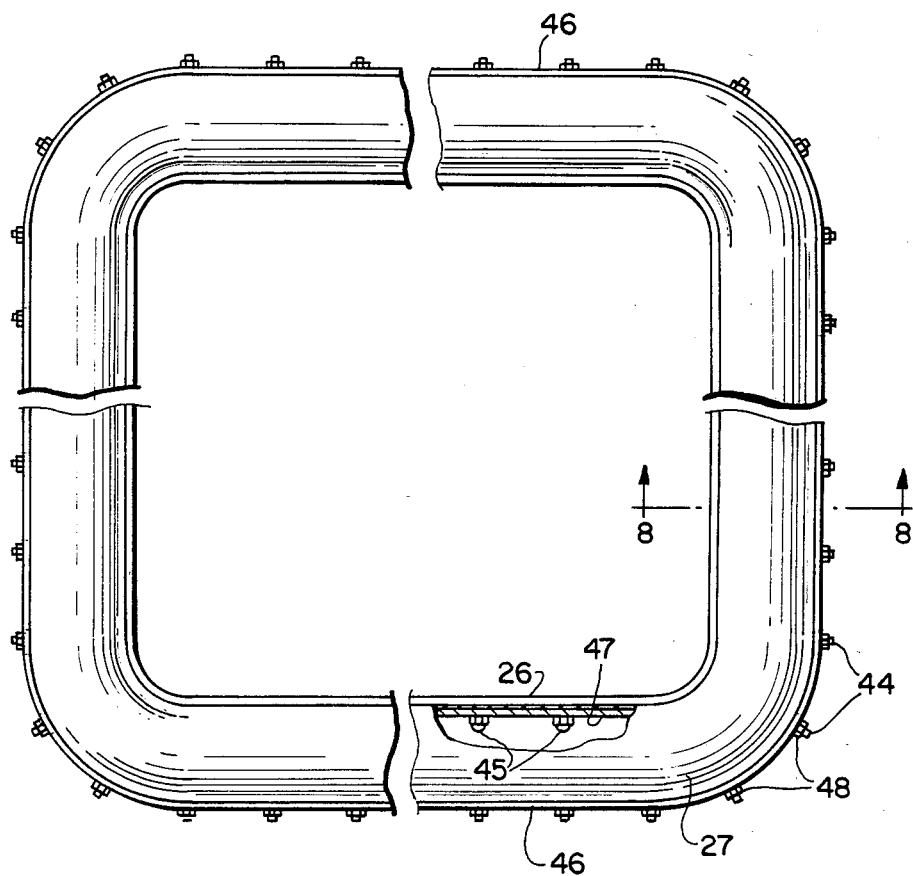
FIG. 7 is a front elevational view (enlarged and partially broken away) of just the sealing ring portion of the damper, showing the ring inflated to atmospheric pressure. This figure illustrates the shape of the sealing ring when it is unobstructed (i.e., when it is detached from the damper).
Figure 8:
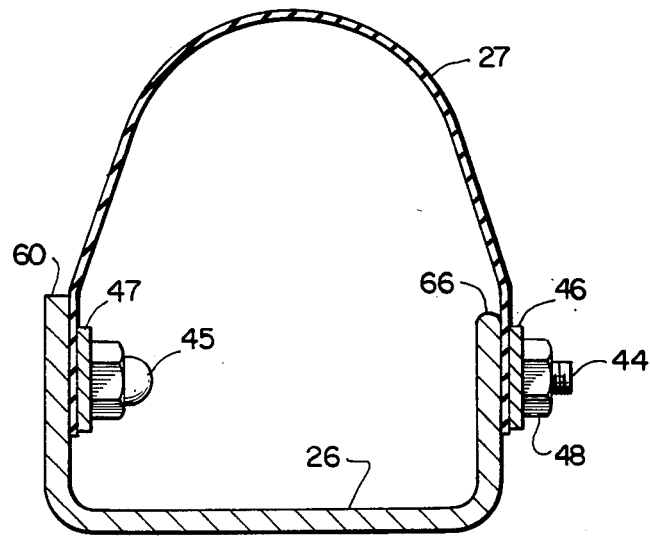
FIG. 8 is a further enlarged, sectional view, taken along the line 8—8 in FIG. 7, of the sealing ring portion of the damper, again shown inflated to atmospheric pressure and detached from the damper.

A smaller, rectangular frame 26, having rounded corners, is sized to fit inside the channel formed by members 11, 12, and 13 of main frame 10. As best seen in FIGS. 7, 8, and 9, a ring 27 of flexible, durable, air-tight, sheet material, such as a laminated fabric of heat resistant rubber and wire mesh, is bolted to frame 26. Frame 26 is U-shaped in cross-section. Ring 27 is fastened over the mouth of the U to form an air-tight chamber. The ring is held in place by two concentric rows of outwardly projecting, threaded studs, 44 and 54, that are welded to frame 26. Studs 44 and 54 pass through holes (not shown) near the edges of sealing ring 27. Ring 27 is held in place by segmented hoops 46 and 47, which also have holes (not shown) to allow the hoops to fit over the studs, and by hex nuts 48 and acorn nuts 45. Acorn nuts 45 are used to minimize abrasion of the inner surface of sealing ring 27 when it is collapsed, as shown in FIG. 5. Similarly, edge 66 of frame 26 is rounded for the same reason.

A pair of upright tubes 28 is welded inside frame 26 to give it added support and to help guide blade 16. A rubber gasket 30 is interposed between small frame 26 and members 11, 12, 13, and 14 to effect an air-tight seal between frames 26 and 10. (See FIGS. 4, 5, and 6.) Small frame 26 is held in place by a ring of bolts 34 that are screwed into cap nuts 36, which are welded to the inside wall of small frame 26. Each bolt 34 is fitted with a flat washer 35. (Alternatively, and not shown in the drawings, smaller frame 26 can be equipped with threaded studs that are welded to the frame and protrude through holes in main frame 10.)

T-nozzle 37 (shown schematically in FIGS. 1, 2 and 3) is connected to the chamber behind ring 27. The two arms of nozzle 37 are connected as indicated to sources of vacuum and air pressure (not shown). (Whereas the drawings show nozzle 37 located on the side of frame 10, it may be preferred to locate it at the bottom of the frame.) For the damper depicted in the drawings a vacuum line that will pull about 4 to 8 inches of mercury (equivalent to a water column height of about 55 to 110 inches) is preferred, and a source of air at about 5 to 10 psig is preferred.

Two lengths of double thickness sealing strips, 39 and 40, are mounted on the opposite sides of opening 15 in main frame 10. (See FIG. 4.) Sealing strips 40 are carried by cover plate 41, which is bolted to upper horizontal member 14 of main frame 10.

Access panels 50, 51, 52, and 53 (see FIGS. 1, 2 and 3) permit inspection of the damper when it is installed in a conduit.

Whenever blade 16 is to be moved, sealing ring 27 is collapsed (as shown in FIGS. 1 and 5) by closing nozzle 37 to the source of pressurized air and opening it to the vacuum source. The resulting collapse of ring 27 creates a wide separation between it and blade 16. In this way, even if blade 16 should translate forward and back as it is moved, it is unlikely to come into contact with ring 27. Indeed, in the preferred embodiment shown in the drawing, ring 27 withdraws so far when it is deflated that it is behind the plane of edge 60 of small frame 26 (see FIG. 5); in than manner the rear face 67 of blade 16 is stopped by edge 60 from coming into contact with ring 27.

After the movement of the blade is complete—either to the open position or the closed position—ring 27 is reinflated to sealing pressure, as shown in FIGS. 2, 4, and 6. In the closed position, ring 27 squeezes blade 16 between ring 27 and channel wall 61 of frame 10. (See FIGS. 2 and 6.) The resultant seal makes the damper extremely tight and allows it to be used in flue gas conduits to protect downstream workers. Moreover, the amount of air pressure required to effect the seal is minimal—only a few pounds more than conduit pressure on the upstream side. This is because ring 27 needs only to be inflated for it to make sealing contact against blade 16; it does not have to be expanded as well.

Typically, the damper will be oriented in the conduit so that the sealing ring 27 is on the high pressure side of blade 16.

When the damper is open, as shown in FIG. 4, inflated sealing ring 27 closes opening 15 in main frame 10 and prevents the escape of any gasses to the atmosphere. (Strips 39 and 40 provide back-up sealing of opening 15 and reduce atmospheric leakage when blade 16 is in movement.) Similarly, inflated ring 27 reaches across the openings to channel members 11, 12 and 13 and effectively blocks those openings as well, preventing debris from collecting in bottom channel 12.

By virtue of the present invention, in a sliding blade closure apparatus of the typ disclosed herein the danger of the moving blade abrading the inflatable sealing ring is reduced considerably, but without sacrificing the ability of the ring to seal.

We claim:

1. In a conduit closure apparatus comprising a frame adapted for connection to a conduit in a position generally in registry with the conduit, a movable blade slidably mounted in the frame, an opening in the frame through which the blade may slide, means for moving the blade back and forth between an open position in which the blade is outside the conduit and a closed position in which the blade blocks the conduit, an inflatable sealing ring mounted in the frame that is operable, when inflated, to press against the face of the blade around the blade's periphery when the blade is in the closed position, thereby creating a seal between the blade and the frame, and means for inflating said sealing ring, the improvement wherein the apparatus has means for pulling a sufficient vacuum on the interior of the sealing ring to cause the ring to collapse and recede from contact with the blade, thereby creating a wider separation between the ring and the blade than if the interior of the ring were at atmospheric pressure; the frame includes a channel in which the blade slides and in which the blade sits when in the closed position; the ring is located inside the channel and is fastened to one of the walls of the channel so that the ring presses against the side of the blade when the blade is in the closed position and the ring is inflated, thereby squeezing the blade between the ring and the opposite wall of said channel; and the ring is capable of being inflated sufficiently to press against the opposite wall of the channel when the blade is in the open position, so as to seal the mouth of the channel.

2. The apparatus of claim 1 wherein the opening in the frame through which the blade slides is a slot-like port that has a wall along substantially the entire length of each of the opposite sides of the port; said port walls are substantially parallel to the plane of the blade; a segment of the ring is fastened to one of the port walls so that the ring presses against the face of the blade when the blade is in the closed position and the ring is inflated, thereby squeezing the blade between the ring and the opposite wall of the port; and the ring is capable of being inflated sufficiently to press against the opposite wall of the port when the blade is in the open position, so as to seal the port.

3. The apparatus of claim 1 wherein the opening in the frame through which the blade slides is a slot-like port that has a wall along substantially the entire length of each of the opposite sides of the port; said port walls are substantially parallel to the plane of the blade; a segment of a ring is fastened to one of the port walls so that the ring presses against the face of the blade when the blade is in the closed position and the ring is inflated, thereby squeezing the blade between the ring and the opposite wall of the port; and the ring is capable of being inflated sufficiently to press against the opposite wall of the port when the blade is in the open position, so as to seal the port.

4. The apparatus of claim 1 wherein the frame and the blade are substantially rectangular in shape.

5. The apparatus of claim 2 wherein the frame and the blade are substantially rectangular in shape.

6. The apparatus of claim 3 wherein the frame and the blade are substantially rectangular in shape.

7. The apparatus of claim 1 additionally including stop means which prevent the closed blade from touching the sealing ring whenever the ring is collapsed.

8. The apparatus of claim 7 wherein the stop means comprise one or more rigid members carried by the frame that present a blade-stopping surface lying in a plane somewhere between the closed blade and the collapsed sealing ring.

9. The apparatus of claim 6 additionally including stop means which prevent the closed blade from touching the sealing ring whenever the ring is collapsed.

10. The apparatus of claim 9 wherein the stop means comprise one or more rigid members carried by the frame that present a blade-stopping surface lying in a plane somewhere between the closed blade and the collapsed sealing ring.

* * * * *